(12) United States Patent
Klepser

(10) Patent No.: US 10,153,919 B2
(45) Date of Patent: Dec. 11, 2018

(54) RF TRANSMIT ARCHITECTURE METHODS

(71) Applicant: Intel IP Corporation, Santa Clara, CA (US)

(72) Inventor: Bernd-Ulrich Klepser, Starnberg (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/476,014

(22) Filed: Mar. 31, 2017

(65) Prior Publication Data
US 2018/0287821 A1    Oct. 4, 2018

(51) Int. Cl.
| | |
|---|---|
| H04L 12/64 | (2006.01) |
| H04L 27/00 | (2006.01) |
| H04W 72/04 | (2009.01) |
| H04J 11/00 | (2006.01) |
| H04W 84/12 | (2009.01) |
| H04L 27/34 | (2006.01) |

(52) U.S. Cl.
CPC .......... *H04L 12/64* (2013.01); *H04L 27/0008* (2013.01); *H04J 11/00* (2013.01); *H04L 27/3488* (2013.01); *H04W 72/0446* (2013.01); *H04W 72/0453* (2013.01); *H04W 84/12* (2013.01)

(58) Field of Classification Search
CPC . H04L 12/64; H04L 27/0008; H04L 27/3488; H04W 84/12; H04W 72/0453; H04W 72/0446; H04J 11/00
See application file for complete search history.

(56) References Cited

U.S. PATENT DOCUMENTS

| | | | |
|---|---|---|---|
| 8,891,681 B2 * | 11/2014 | Boos | ............... H04L 27/00 375/224 |
| 8,909,175 B1 | 12/2014 | McCallister | |
| 9,118,277 B2 | 8/2015 | Balteanu et al. | |
| 9,385,662 B2 | 7/2016 | Wimpenny | |
| 9,391,649 B2 | 7/2016 | Wang | |
| 9,425,744 B2 | 8/2016 | Yang et al. | |

(Continued)

OTHER PUBLICATIONS

"U.S. Appl. No. 15/475,996, Notice of Allowance dated Jul. 5, 2018", 10 pgs.

(Continued)

*Primary Examiner* — Vineeta S Panwalkar
(74) *Attorney, Agent, or Firm* — Schwegman Lundberg & Woessner, P.A.

(57) ABSTRACT

A transmitter device is switchably operable in a digital IQ mode (DIQM) of operation and a polar mode (PM) of operation. The device has a switch logic processor that determines an attribute of operation of the transmitter device. When a first condition of the attribute is met, the switch is to switch to or remain in the PM, and when a second condition of the attribute is met, the switch is to switch to or remain in the DIQM. The attribute may be: a modulation bandwidth to be used during a transmission time slot, whether a transmission is to be a non-contiguous single-carrier transmission or a non-contiguous multiple-carrier transmission, a contiguous single-carrier transmission or a contiguous multiple-carrier transmission, whether a low or high EVM mode transmission is to be used during a transmission time period, whether an LTE, a 5G, or a Wi-Fi mode transmission is to be used, among others.

7 Claims, 6 Drawing Sheets

(56) References Cited

U.S. PATENT DOCUMENTS

| | | |
|---|---|---|
| 9,627,975 B2 | 4/2017 | Khlat et al. |
| 9,973,370 B1 | 5/2018 | Langer et al. |
| 2009/0190692 A1 | 7/2009 | Aniruddhan et al. |
| 2009/0300456 A1* | 12/2009 | Pelletier ................ H04L 1/1812 |
| | | 714/749 |
| 2010/0056068 A1 | 3/2010 | Takinami et al. |
| 2011/0058601 A1 | 3/2011 | Kim et al. |
| 2011/0158156 A1* | 6/2011 | Ma .................... H04B 7/15542 |
| | | 370/315 |
| 2011/0188604 A1 | 8/2011 | Wagner |
| 2013/0251068 A1 | 9/2013 | Boos et al. |
| 2014/0055197 A1 | 2/2014 | Khlat et al. |
| 2014/0111178 A1 | 4/2014 | Khlat et al. |
| 2014/0119476 A1 | 5/2014 | Marsili et al. |
| 2014/0155127 A1 | 6/2014 | Dakshinamurthy et al. |
| 2014/0293789 A1* | 10/2014 | Machida ............... H04L 45/121 |
| | | 370/235 |
| 2015/0194936 A1 | 7/2015 | Inanoglu et al. |
| 2015/0236652 A1 | 8/2015 | Yang et al. |
| 2017/0257774 A1* | 9/2017 | Ghosh .................. H04W 16/14 |

OTHER PUBLICATIONS

"International Application Serial No. PCT/US2018/024585, International Search Report dated Jul. 27, 2018", 3 pgs.

"International Application Serial No. PCT/US2018/024585, Written Opinion dated Jul. 27, 2018", 4 pgs.

"International Application Serial No. PCT/US2018/024589, International Search Report dated Jul. 16, 2018", 4 pgs.

"International Application Serial No. PCT/US2018/024589, Written Opinion dated Jul. 16, 2018", 5 pgs.

* cited by examiner

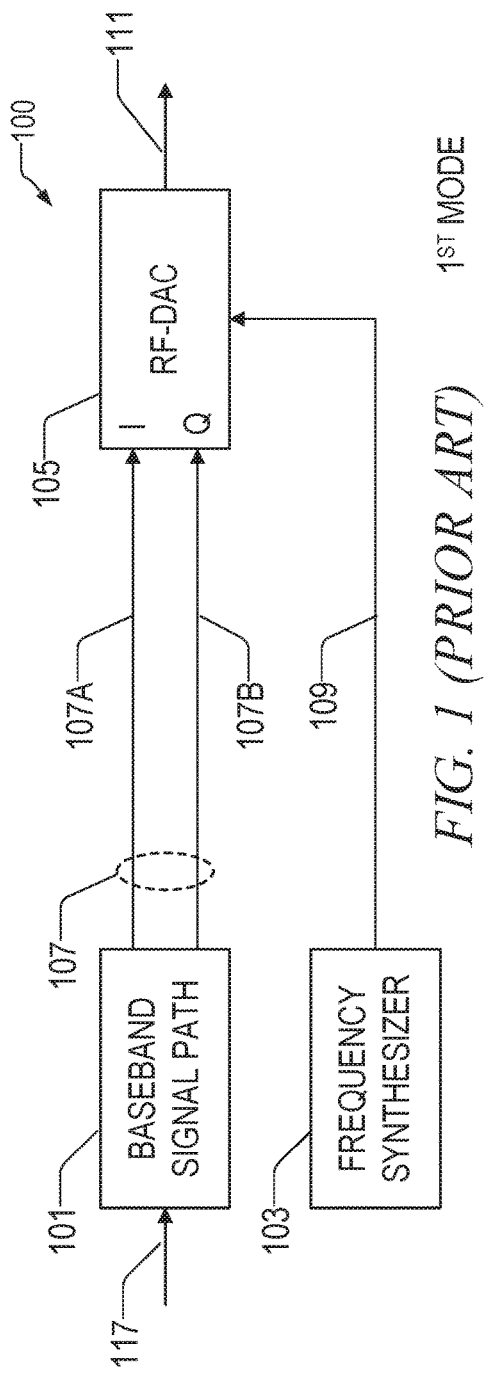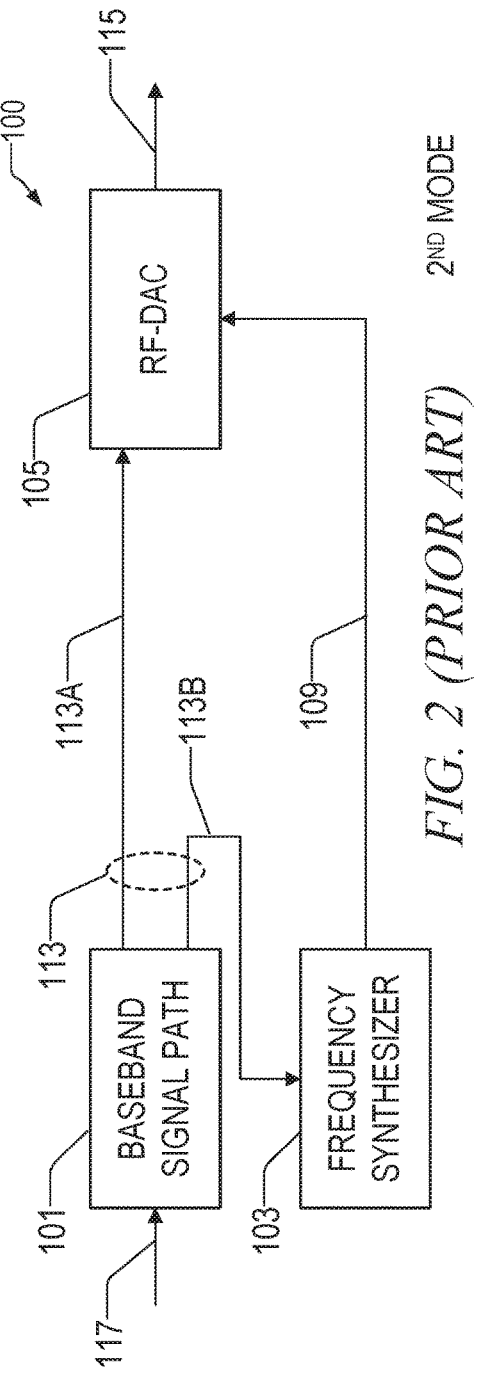

1ST MODE

2ND MODE

RF TRANSMIT ARCHITECTURE METHODS

TECHNICAL FIELD

The present disclosure relates to methods for operating a radio frequency digital to analog converter that is capable of operating in either a polar mode or a digital IQ mode.

BACKGROUND

U.S. Pat. No. 8,891,681 (the '681 patent) describes a transmitter capable of switching between operation in a first mode which provides a vector-modulated RF output signal (also called digital IQ mode (DIQM)), and a second mode which provides a polar-modulated RF output signal (also called polar mode (PM)).

The polar transmit architecture offers a lower power consumption compared to IQ architectures, while high modulation bandwidths are easier achieved with IQ transmit architectures. However, it may be difficult to utilize a switchable architecture in order to achieve a good power consumption vs. design complexity tradeoff.

BRIEF DESCRIPTION OF THE DRAWINGS

FIGS. 1 & 2 are block diagrams that replicate FIG. 1A and FIG. 1B of the '681 patent;

DETAILED DESCRIPTION

Figure 3:
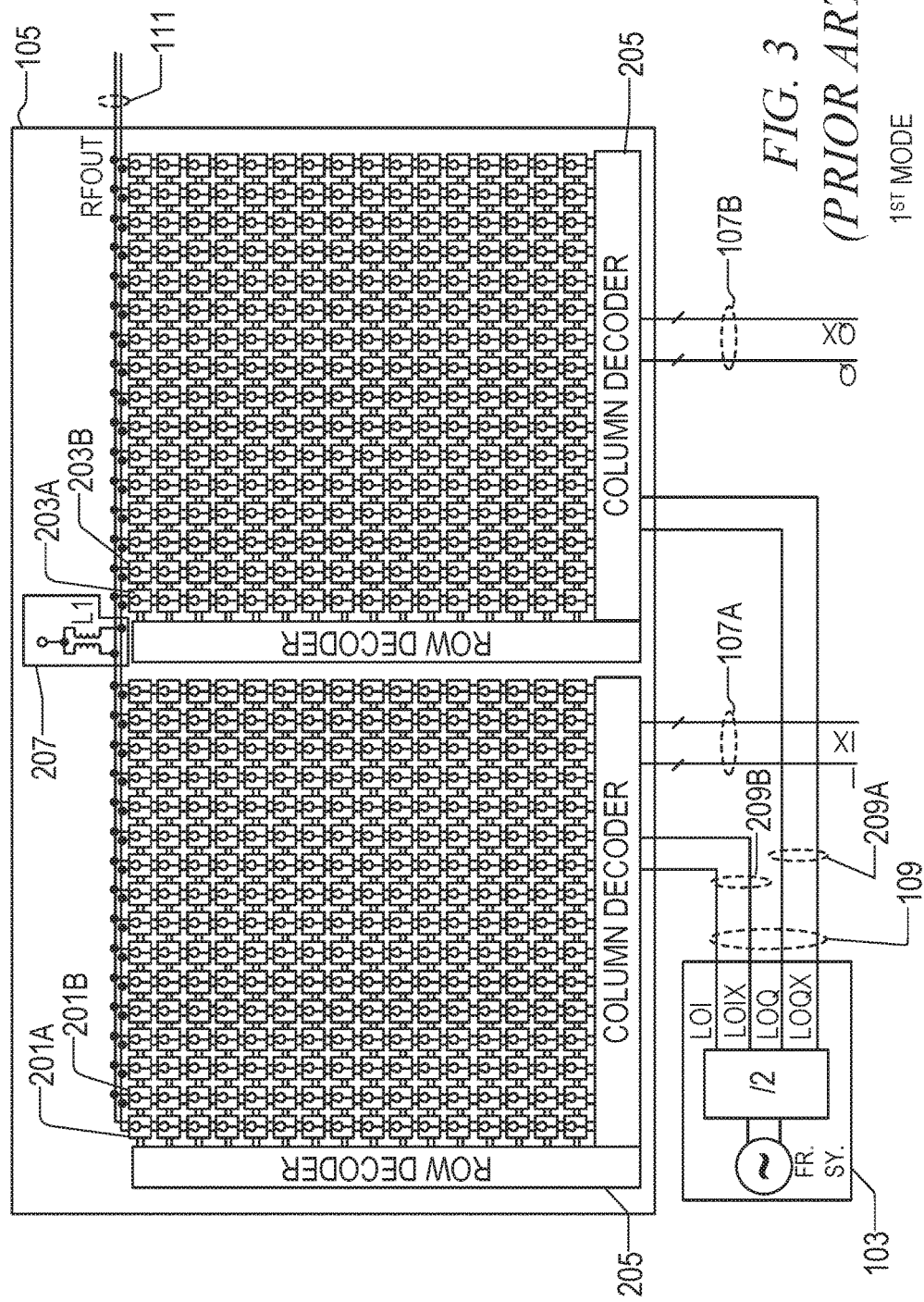
FIGS. 3 and 4 are pictorial schematic diagrams that replicate FIGS. 2C and 2F of the '681 patent.

The following is a detailed description of various configurations depicted in the accompanying drawings. However, the amount of detail offered is not intended to limit anticipated variations of the described configurations; to the contrary, the claims and detailed description are to cover all modifications, equivalents, and alternatives falling within the spirit and scope of the present teachings as defined by the claims. The detailed descriptions below are designed to make such configurations understandable to a person having ordinary skill in the art.

The basic architecture of the '681 patent is described to provide a base for the novel features described herein.

FIGS. 1 and 2 are block diagrams that essentially replicate FIG. 1A and FIG. 1B of the '681 patent.

FIG. 1 shows the transmitter 100 in a first mode, in which the transmitter is designed to provide a vector-modulated RF output signal, and FIG. 2 shows the transmitter 100 in a second mode, in which the transmitter is designed to provide a polar-modulated RF output signal which may be generated by modulation of an oscillator or by modulating a digital to time controller (DTC).

The transmitter 100 comprises a baseband signal path 101, a frequency synthesizer 103 and a radio-frequency digital-to-analogue converter (RF-DAC) 105.

The baseband signal path 101 is designed to provide a first baseband signal 107 having an in-phase component 107A and a quadrature component 107B in the first mode of the transmitter 100. The frequency synthesizer 103 is designed to provide an oscillator signal 109. Furthermore, the frequency synthesizer 103 is designed to provide the oscillator signal 109 as an unmodulated signal in the first mode of the transmitter 100. The RF-DAC 105 is designed to receive the first baseband signal 107 and the oscillator signal 109, and is furthermore designed to provide, in the first mode, a vector-modulated RF output signal 111, on the basis of the first baseband signal 107 and the oscillator signal 109 (as an unmodulated signal).

Furthermore (as is shown in FIG. 2), the baseband signal path 101 is designed to provide a second baseband signal 113 having an amplitude component 113A and a phase component 113B in the second mode of the transmitter 100. The oscillator 103 is furthermore designed to provide the oscillator signal 109 as a modulated signal in the second mode of the transmitter 100. A modulation of the oscillator signal 109 in the second mode is based on the phase component 113B of the second baseband signal 113 (provided by the baseband signal path 101).

The RF-DAC 105 is furthermore designed to receive the amplitude component 113A of the second baseband signal 113, and is furthermore designed to provide, in the second mode of the transmitter 100, a polar-modulated RF output signal 115, on the basis of the amplitude component 113A of the second baseband signal 113 and of the oscillator signal 109 (a modulation thereof is based on the phase component 113B of the second baseband signal 113).

The transmitter 100 may be designed to switch from the first mode, shown in FIG. 1, into the second mode, shown in FIG. 2, or from the second mode into the first mode.

Consequently, the transmitter 100 shown in FIGS. 1 and 2 is designed to perform a vector modulation (also called IQ modulation) in the first mode and a polar modulation in the second mode. Thus it is possible to provide a configurable TX (transmit) architecture with both polar modulation and IQ modulation.

Furthermore, as may be seen from FIGS. 1 and 2, one and the same RF-DAC 105 and also one and the same frequency synthesizer 103 may be used for the vector modulation (in the first mode) and the polar modulation (in the second mode), although this configuration is not essential to the systems and methods described herein.

As an example, for a modulation bandwidth to a given, predetermined bandwidth threshold (e.g., 5 MHz, 20 MHz, or 50 MHz), the transmitter 100 (and therefore also the RF-DAC 105) may operate as a polar modulator (in the second mode) and, for a modulation width above the predetermined bandwidth threshold (e.g., for the case of Long Term Evolution (LTE) carrier aggregation), the transmitter 100 (and therefore also the RF-DAC 105) may operate as an IQ or vector modulator (in the first mode). Therefore, the baseband signal path 101 is also configurable between these two modes. As an example, the baseband signal path 101 may have a COordinate Rotation DIgital Computer (CORDIC) module, which may be used only in the second mode, while it is bypassed in the first mode. One advantage is a lower current consumption for the 2G/3G and 4G standards predominantly in use, as a result of using a polar modulation (in the second mode).

A further advantage of this example is that the problems which occur in particular for polar modulation systems having a high bandwidth, that the modulation of the DCO and the delay between the amplitude component and the phase component become critical, may be prevented by switching into the vector modulation mode for these high bandwidths. Consequently, these problems no longer occur since, in the vector modulation mode, the oscillator signal 109 is to be provided as an unmodulated signal.

As a further example, for a single-antenna transmission mode, the transmitter 100 may operate in the second mode (as a polar modulator), and the phase-modulated oscillator signal 109 is to be provided by the frequency synthesizer 103, e.g., with a phase-modulated DCO (digitally controlled oscillator). For a multi-antenna transmission mode, the transmitter 100 may be operated in the first mode (as a vector modulator), in which the unmodulated oscillator signal 109 is provided by the frequency synthesizer 103. One advantage of this example is an expected lower current consumption for the multi-antenna transmission mode (e.g., multiple input multiple output (MIMO)) as a result of using the IQ or vector modulation mode, while a low current consumption in the single-transmission mode predominantly in use is furthermore maintained using the polar modulation mode (the second mode).

In contrast to this, conventional systems using only a polar modulation would require a plurality of synthesizers for generating the different transmission signals, which usually leads to a higher current consumption for the polar modulator concept in comparison with the vector modulator concept.

The baseband signal path 101 may be designed to receive (digital) data signals 117, and may be designed to provide the first baseband signal 107 in the first mode and the second baseband signal 113 in the second mode on the basis of the data signals 117. Consequently, the data signals 117 may be independent of the current mode of the transmitter 100, and the baseband signal path 101 may supply the first baseband signal 107 having the in-phase component 107A and the quadrature component 107B if the transmitter 100 is presently in the first mode, or may supply the second baseband signal 113 having the amplitude component 113A and the phase component 113B if the transmitter 100 is at present in the second mode.

As discussed above, the mode of the transmitter 100 may be selected (e.g., by the transmitter itself) depending on a resulting modulation bandwidth (of the resulting RF output signal 111, 115) and/or the number of RF output signals which are intended to be provided simultaneously (e.g., single-antenna mode or multi-antenna mode).

A frequency of the oscillator signal 109 in the first mode and the second mode may be selected depending on the communication standard which is required for the RF output signals, and may be, for example, a carrier frequency of such a communication standard.

In the case of the vector modulation mode or first mode of the transmitter 100, the oscillator signal 109 is provided as an unmodulated signal, for example having a fixed RF-LO (local oscillator) frequency. In the case of the polar modulator mode or the second mode of the transmitter 100, the oscillator signal 109 is provided as a modulated signal, for example as a phase-modulated LO signal (the carrier frequency mentioned being superposed with the phase modulation, determined by the phase component 113B of the second baseband signal 113).

As an example, the RF-DAC 105 may have 256 of these in-phase mixer cells 101A and 256 of these quadrature mixer cells 203A in order to achieve 512 I-paths and 512 Q-paths.

Figure 4:
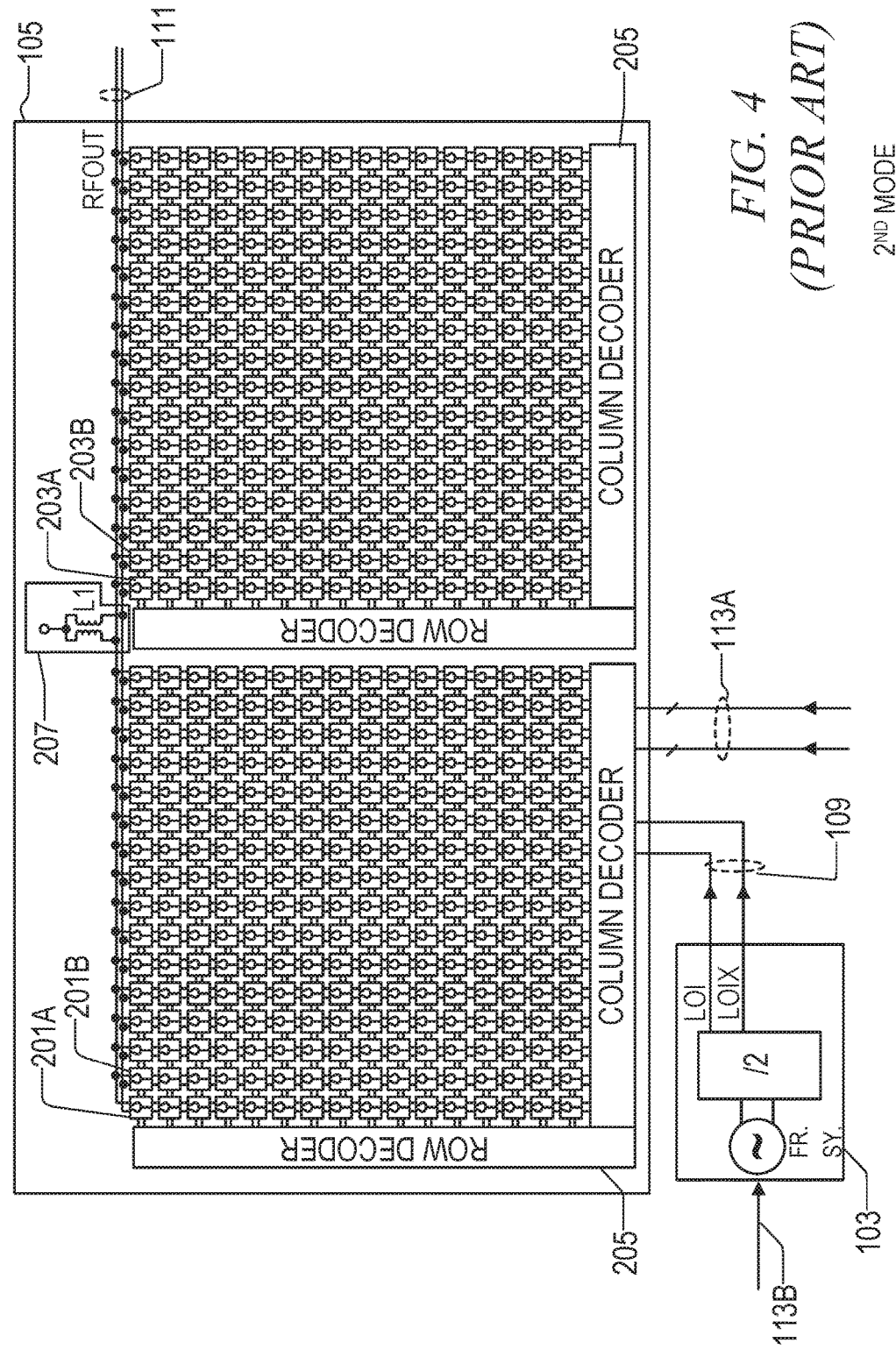

FIGS. 3 and 4 are pictorial schematic diagrams that replicate FIGS. 2C and 2F of the '681 patent.

FIG. 3 is pictorial schematic diagram of a circuit of a known RF-DAC 105 having 256 in-phase mixer cells 201A, 201B and 256 quadrature mixer cells 203A, 203B. The quadrature mixer cell 203A is correspondingly coupled to the common summing terminal 207 in order to achieve the desired mixing of the in-phase component 107A and the quadrature component 107B of the first baseband signal 107, in order to obtain the vector-modulated RF output signal 111 as a result of this mixing.

Furthermore, as is shown in FIG. 3, the different differential oscillator signals (the in-phase oscillator signal 209A and the quadrature oscillator signal 209B) may already be provided by the frequency synthesizer 103 and are distributed in the RF-DAC 105 among their assigned in-phase mixer cells 201A, 201B or quadrature mixer cells 203A, 203B.

Furthermore, as may be seen from FIG. 3, the RF-DAC 105 may have a first row decoder and a first column decoder for the in-phase mixer cells 201A, 201B and a second row decoder and a second column decoder for the quadrature mixer cells 203A, 203B.

The first row decoder and the first column decoder may be designed to determine a plurality of vector modulation control signals for the in-phase mixer cells 201a, 201B on the basis of the in-phase component 107A. The second row decoder and the second column decoder may be designed to determine a plurality of vector modulation control signals for the quadrature mixer cells 203A, 203B on the basis of the quadrature component 107B.

To put it another way, FIG. 3 shows a digital vector modulator having distributed mixers (the mixer cells 201A, 201B and the mixer cells 203A, 203B) in which the mixing of the carrier signal (of the oscillator signal 109) with the digital baseband signal (the first baseband signal 107) is effected in the digital control circuit (realized by the mixer cells 201A. 201B and 203A, 203B). As an example, the in-phase component 107A and the quadrature component 107B may in each case correspond to a binary output word in response to which the decoder 205 activates or deactivates specific mixer cells and therefore activates or deactivates specific controllable current sources of the mixer cells 201A, 201B, 203A, 203B. The digital-to-analogue conversion and the radio-frequency mixing are effected in each individual mixer cell (or element) of the two cell arrays, shown in FIG. 3.

As was mentioned in conjunction with FIG. 1, the RF-DAC 105 is designed to provide, in the second mode of the transmitter 100, the polar-modulated RF output signal 115 on the basis of the oscillator signal 109 (which is a modulated signal) and the amplitude component 113A of the second baseband signal 113. Consequently, different possibilities of the implementation of the RF-DAC 105 for the second mode of the transmitter 100 are described below, in which both implementations have the same features insofar as at least some of the mixer cells of the RF-DAC 105 are used in the first mode for providing the vector-modulated RF output signal 111 and are also used in the second mode for providing the polar-modulated RF output signal 115.

In a first example, for an implementation of the RF-DAC 105, only a portion of the mixer cells of the RF-DAC 105 which are used for providing the vector-modulated RF output signal 111 in the first mode are used for providing the polar-modulated RF output signal 115 in the second mode.

In the example described below, the in-phase mixer cells (e.g., the in-phase mixer cells 201A, 201B) of the RF-DAC 105 are used for providing the polar-modulated RF output signal 115. Instead of using the in-phase mixer cells, it is also possible to use the quadrature mixer cells (e.g., the quadrature mixer cells 203A, 203B) for providing the polar-modulated RF output signal 115. It is also possible to use only a portion of the in-phase mixer cells or quadrature mixer cells for providing the polar-modulated RF output signal 115.

In the configuration in which the same RF-DAC 105 is used for providing the vector-modulated RF output signal 111 in the first mode and the polar-modulated RF output signal 115 in the second mode, the structure remains the same (e.g., the mutual connection between the mixer cells of the RF-DAC 105). Usually, the only difference between the first mode and the second mode in the RF-DAC 105 is the function of the decoder 205, which supplies the control signals and the oscillator signals to a plurality of mixer cells 201A, 201B, 203A, 203B.

FIG. 4 is a pictorial schematic diagram that shows the implementation of the RF-DAC 105 from FIG. 3 in the second mode using the implementation in which only the first sub-plurality 201 of the mixer cells 201A, 201B is used for providing the polar-modulated RF output signal 115. As is shown in FIG. 4, it suffices to provide the oscillator signal 109 and the amplitude component 113A of the second baseband signal 113 for the first row decoder and for the first column decoder of the decoder 205 for the in-phase mixer cells 201A, 201B. Furthermore, as may be seen from FIG. 4, the frequency synthesizer 103 is designed, in the second mode, to receive the phase component 113B of the second baseband signal 113 and to provide the oscillator signal 109 as a modulated signal on the basis of the phase component 113B. The first row decoder and the first column decoder are designed to provide, on the basis of the amplitude component 113a, the polar modulation control signals 241A, 241B for the mixer cells 201A, 201B for activating, depending on the amplitude component 113A, specific mixer cells of the first sub-plurality 201 of the mixer cells 201A, 201B.

A superposition of the output signals of the activated mixer cells at the common summing terminal 207 is the polar-modulated RF output signal 115 for example as a differential signal.

The RF-DAC 205 may be designed to use the first sub-plurality 201 of mixer cells 201A, 201B and the second sub-plurality 203 of mixer cells 203A, 203B in the second mode for providing the polar-modulated RF output signal 115.

Despite the known structures describe above, however, precise criteria and methods for utilizing this structure have not been provided. Thus, the following describes methods for using the RDFAC in PM or DIQM that is dependent on the requirements of the RF system. These criteria and methods may include: 1) low-bandwidth to high-bandwidth transitions; 2) non-contiguous single carrier to multiple carrier transitions; 3) contiguous single carrier to dual carrier-multiple carrier transitions; 4) low error vector magnitude (EVM) to high EVM transitions; 5) LTE to 5G transitions; and 6) LTE to Wi-Fi transitions. Benefits of use may include power efficiency, optimizing use of available signal bandwidth, oscillator mapping, or oscillator count (for example, chip size) optimization.

Figure 5:
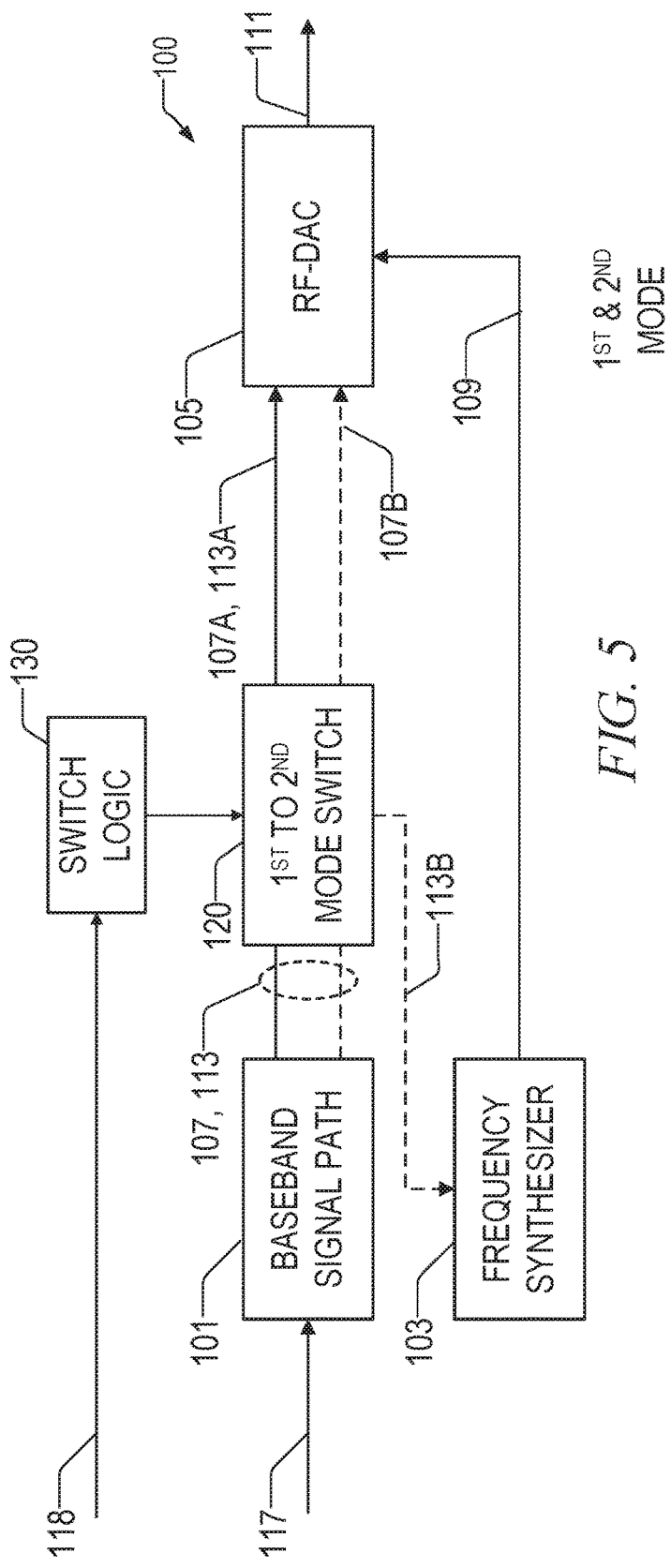
FIG. 5 is a block diagram the combines similar FIGS. 1 and 2, and expressly shows a transmitter with a switch as well as switch logic, according to various implementations as described herein.

FIG. 5 is a block diagram the combines similar FIGS. 1 and 2, and expressly shows a transmitter 100 with a switch 120 that allows the switching from the first mode (DIQM) to the second mode (PM), although, as noted above, the design is not limited herein to a single RF-DAC design. Connected to the switch 120 is the newly defined switch logic 130 that, based on a control input 118, provides to the switch 120 whether or not to change state based on various criteria. The switch logic may be implemented in hardware, software, or any combination of the two.

The following use case is considered below. An LTE voice call uses a transmit bandwidth of 5 MHz followed by a base station request to switch to a 60 MHz signal bandwidth LTE 3×20 MHz. In a known architecture of a polar-only mode, the polar TX mode has the best-known power efficiency. However, the drawback is a high tuning range requirement on the digitally controlled oscillator (DCO). For up to 20 MHz bandwidths, this requirement may be achieved with medium effort. However, a DCO designed for a signal bandwidth of 60 MHz is expected to have a very large varactor field with a low Q in the tank and a very low band selection tuning range. This would result in a large chip area and high power consumption.

In a known architecture for operating in a DIQM, the IQ TX mode has the best known TX architecture for high signal bandwidth and low EVM requirements. The drawback is a large required cellfield per unit of output power, resulting in a higher current consumption. Therefore, the initial battery current during the LTE voice call is 20-40% higher when using the DIQM compared to the PM. Since power consumption during the voice call is an important key performance indicator (KPI) for the end user, this results in a competitive disadvantage. When switching to a 60 MHz LTE bandwidth, this implementation does not require a change in the DCO tuning range, and it therefore offers a lower chip area (low DCO count).

In the architecture described herein, switching from the PM to the DIQM mode for transmission combines the advantages of each mode by starting the LTE voice call in the PM and switching to the DIQM when a large signal bandwidth is required. The result is an improved power consumption and a low chip size overhead for enabling the LTE 60 MHz feature.

The methods described herein may be utilized by a device having the structure described above and in the '681 patent. However, these methods are not limited to a single RF-DAC that may be operated in DIQM or PM, and thus the device may also include a more general system having multiple RF-DACs that may be either operated in DIQM, PM, or a combined DIQ+polar combination mode. Therefore, the term "device" as used herein may include a single or multiple RF-DAC design, and the "switching" of a device from one mode or the other could employ the single or multiple RF-DACs discussed above.

In one implementation, the base station indicates to a remote unit that it should change its communication state in some way, for example, that it should operate in a lower or higher bandwidth mode. When the remote unit receives that indication, then the device of the remote unit may determine that it should switch from the DIQM to the PM, or vice versa, for the next transmission period. The switching from single carrier to dual carrier may be fully synchronized between the base station and the remote unit In one implementation, when the device switches a mode of transmission, that mode of transmission is frozen for some predefined period of time (such as a transmission block) and the device does not switch transmission modes during a normal transmit operation. The base station informs the remote device of the remote device's needed bandwidth so that the remote device may set its mode properly for the next transmit cycle.

Figure 6:
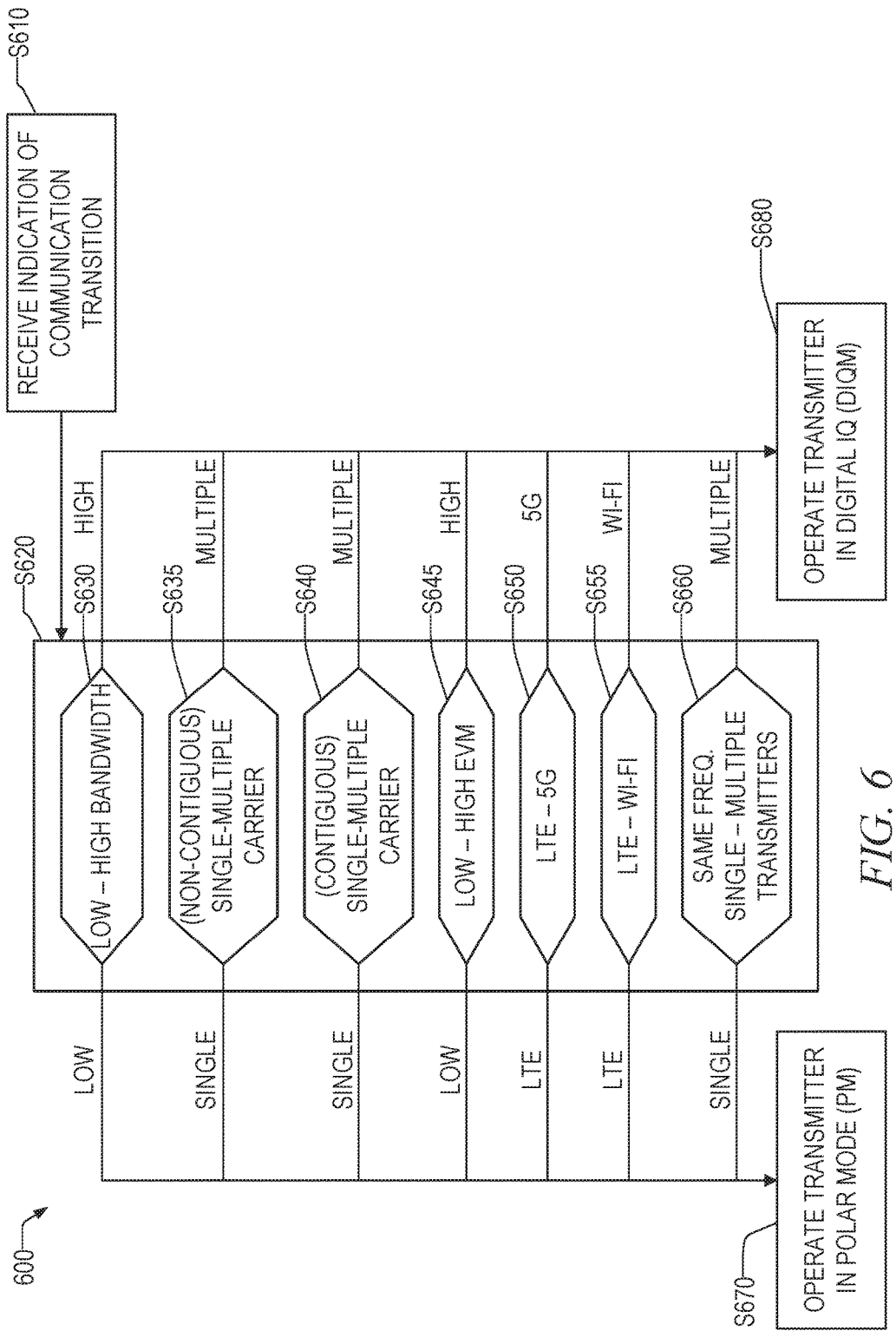
FIG. 6 is a flowchart that illustrates a process for the various switching determinations and switch logic, according to various implementations described herein.

FIG. 6 is a flowchart that illustrates a process 600 for the various switching determinations and switch logic 130. The switch logic 130 may receive an indication of some form of communication transition S610. Based on the configuration of the switch logic 130, one or more of the logical decisions S620 may be invoked. The outcome of each of the logical decisions S620 may be either to operate the transmitter in the PM S670 or operate the transmitter in the DIQM S680.

The logic S620 for the respective decisions is discussed in the following.

1) Low-Modulation Bandwidth to High-Modulation Bandwidth Transitions S630

When the remote unit receives an indication from the base station to increase its bandwidth during a particular time period that exceeds some threshold amount S630:HIGH, the device of the remote unit, if it is operating in a PM, is switched operate in a DIQM S680. Although the power consumption is better when operating the device in PM at a low signal bandwidth (such as LTE 5), operation in PM is not possible above some threshold limit. For example, at present, PM operations above approximately 40 MHz (e.g., LTE 40) are not advantageous since a large tuning bandwidth would lead to a large modulation tuning varactor array, thereby reducing the overall tuning range of each oscillator and resulting in a high oscillator count for a given amount of frequency bands to be supported. Thus, in a present system, the threshold may be set at 40 MHz. This switching threshold may be increased as future developments permit PM operation at higher bandwidths. Conversely, when the remote unit receives an indication from the base station to decrease its bandwidth that falls below the threshold amount S630:LOW, the device of the remote unit, if it is operating in a DIQM, is switched operate in a PM S670.

2) Non-Contiguous Single-Carrier to Dual-Carrier or Multiple-Carrier Transitions S635

When the remote unit receives an indication from the base station that it is to switch from a single-carrier mode to a non-contiguous dual- (or multiple-) carrier mode S635:MULTIPLE, the device may be switched from the PM to the DIQM S680, and vice versa (S635:SINGLE, S670), and the decision to switch may be done independent of the bandwidth. This may also include performing a switching from PM to DIQM if there is an expected harmonic crosstalk (due to a change in the DCO frequency). Conversely, it may include a switching from DIQM to PM to allow for better DCO frequency mapping. An Example of harmonic crosstalk scenarios may be a band combination 2A-8A (1850-1910 MHz vs. 880-915 MHz). In this scenario, a second harmonic of the band eight transmitter (2×915 MHz=1830 MHz) is very close in frequency to the band two transmitter, which leads to a different cross talk behavior (and crosstalk mitigation measures) for polar or IQ architectures. Especially in polar operation, an instant frequency of the exact second harmonic may occur due to modulation of the synthesizer signal. More critical band combinations include Bd2-Bd20 (1850-1910 MHz vs. 832-862 MHz with second harmonic crosstalk) and Bd1-Bd28 (1920-1980 MHz vs. 703-748 MHz with third harmonic crosstalk).

Although PM is preferred from a power perspective, if the demands of using two or more carriers at the same time, considering the harmonics, expected crosstalk, or tuning range suggest use of the DIQM, then the device may be switched to the DIQM to achieve the desired performance.

By way of example, the remote unit may be configured to transmit in a first band using LTE 20 in PM. The base station then informs the remote unit to prepare for dual band transmission. The remote unit, based on the indication of preparing for dual band transmission, switches the transmission of the first band to use the DIQM (and the other way around, i.e., for the second band). The system does not require that all transmission bands use the same mode. Therefore, it is possible that, based on various criteria described herein, one band uses the PM and another band uses DIQM. Examples of criteria may be used output power (for the higher power, polar has best efficiency), or location of the receiving bands (in two carrier (2CA) upload (UL) there may only be one RX band active, and IQ may give more or margin at the duplex distance), or IQ may be used near the frequency band edge of a DCO because it requires no additional tuning range for modulation.

3) Contiguous Single-Carrier to Multiple-Carrier Transitions S640

When the remote unit receives an indication from the base station that it is to switch from a single-carrier mode to a contiguous multiple-carrier mode S640:MULTIPLE, the device may be switched from the PM to the DIQM S680, and vice versa (S640:SINGLE, S670). As noted above, this transition may occur on a band-by-band basis. This configuration is similar to the determination of switching based on bandwidth, due to the fact that contiguous carriers may be considered functionally similar to increasing bandwidth.

By way of example, LTE 20 consists of one-hundred resource blocks, that is, one-hundred separate small frequency bands. For a channel bandwidth of 20 MHz, one-hundred numbered resource blocks of 200 kHz are provided next to each other. The base station indicates which of these numbered resource blocks should be utilized by the remote unit. If the resource load involves blocks around the mid-range, that is, blocks around number fifty, then the system could determine that the PM is appropriate for transmission. However, if the numbered resource blocks are in the corner of the range (that is, blocks zero and ninety-nine), then there may be a problem with utilizing PM, and the DIQM may be chosen.

Note that the number of resource blocks can change, and if the combined bandwidth is within 20 MHz, then this is called "single carrier", and if it is above 20 MHz then it is called multiple carrier. For example, consider two contiguous carriers—in this case, one may count resource blocks (RB) from one to two-hundred. If you are using just two RB, for example, RB99 and RB101 there is only 600 kHz of bandwidth, but this is still considered "multi-carrier" because it occupies two carriers (with one RB each). If using RB1 and RB99, this is still considered "single carrier" (carrier1 has RB1-100 and carrier2 has RB101-200).

Based on this there may be an additional criteria on which to switch. For example, the switching may occur based on the location of the resource blocks (i.e., their proximity to one another. The polar mode may be better when locations of the resource blocks are clustered in the middle (e.g., RB49 and 50) and DIQM may be better when the resource blocks are found at the edges (e.g., RB1 and RB100). Polar is better for close RB combinations (power advantage, smaller bandwidth), but has a drawback at the edges (RB1 and RB100) due to a statistically high number of zero crossings in the constellation diagram leading to high bandwidth requirements.

4) Low EVM to High EVM Transitions S645

An error vector is a vector (distance) in the I-Q plane between an ideal constellation point and a point received by the receiver. The average amplitude of the error vector, normalized to peak signal amplitude, is the error vector magnitude (EVM) (also called receive constellation error). EVM provides a comprehensive measure of radio receiver or transmitter quality for use in digital communications, and the EVM may be degraded by noise, distortion, spurious signals, and phase noise.

When the remote unit receives an indication from the base station that is to switch from a low EVM requirement to a high EVM requirement S645:HIGH, based, for example, on quality-of-service (QoS) or modulation-order requirements, the RF-DAC may be switched from the PM to the DIQM S680, and vice versa (S645:LOW, S670), based on a presumption that better EVM may be obtained with digital IQ. The EVM trigger may be based on a threshold EVM value, or it may be derived from, e.g., the order of the modulation scheme derived below. High modulation schemes generally require high EVM, but there are also softer criteria like higher coding gain (with the same modulation scheme) that require a higher EVM. Thus, the modulation scheme and EVM requirement reflect separate criteria. In an LTE environment, for example, it may be desirable to utilize the PM when a lower order modulation scheme, such as 64-QAM (quadrature amplitude modulation with 64 points (states) on the constellation) is used, but then to switch to the DIQM when a higher order modulation scheme, such as 256-QAM is used, due to the greater noise susceptibility of the latter. The split between low- and high-order modulation schemes could be determined between any number of points or states on the constellation.

5) LTE to 5G Transitions S650

When the remote unit receives an indication that is to switch from LTE to a 5G transmission S650:5G, the RF-DAC may be switched from the PM to the DIQM S680, and vice versa (S650:LTE, S670). The switch to and from 5G may represent a number of variables or factors to consider, including, but not limited to power, EVM, DCO bandwidth, duplex specification, noise requirements, RF output power, RB constellation configurations, and other requirements, that warrant a change to the transmit mode.

6) LTE to Wi-Fi Transitions S655

When the remote unit receives an indication from the base station to switch from LTE to Wi-Fi S655:WI-FI, the device of the remote unit, if it is operating in a PM, may be switched to operate in a DIQM S680, and vice versa (S655:LTE, S670). This switching may be performed independent of the signal bandwidth. Even if both Wi-Fi and LTE are at a particular designated frequency. Note that Wi-Fi 20 and LTE 20, even though they specify 20 MHz, may actually operate at different bandwidths (LTE 20 operates around 15 MHz, whereas Wi-Fi 20 operates around 20 MHz).

7) Single to Multiple Transmitters at Same Frequency Transitions S660

The base station may switch from a single transmitter to multiple transmitters that operate at a same frequency S660: MULTIPLE, and therefore, if it is operating in a PM, may be switched to operate in a DIQM S680, and vice versa (S660:SINGLE, S670). Although one possible implementation may be in a multiple input, multiple output (MIMO) operation, the concept is not so limited. The switching may occur whether the multiple transmitters are directional (by providing an output signal at a same frequency with a phase shift between the two, creating a beamformed signal) or whether they utilize different codes in a code division multiple access (CDMA) channel access method.

In DIQM, the synthesizer is not modulated—it operates at a fixed frequency, which provides an advantage in certain circumstances. For example, if it is desired to have a 2 GHz signal at the transmitter, for a single transmitter and using PM, the DCO is modulated at 4 GHz and the phase of the signal is directly modulated on the DCO. However, it is not possible to add a second transmitter with an independent signal also at 2 GHz using the same DCO, since the DCO operating at 4 GHz is modulated with the signal of the first transmitter (operation of two DCOs at the same frequency on a chip is not possible, since the inductors would couple). Therefore, the device may be switched to the DIQM since the DCO is not modulated and has a single frequency (the modulation is only added in the RF-DAC). This permits a high number of transmitters to be located on the same chip, which all use the same DCO.

The following table summarizes the modes of operation and the transmission changes that may be used to trigger a change of a first operation mode to a second operation mode. By utilizing these operation modes as described herein, devices may realize an improvement in a power key performance indicator and reduce the chip area of an RF product. Furthermore, this design may enable new features at higher bandwidths.

TABLE 1

Summary of Switching/Operating Modes

| | Digital IQ Mode (DIQM) Vector-modulated RF Output Signal | Polar Mode (PM) Polar-modulated RF Output Signal |
|---|---|---|
| Mode Characteristics | Poorer power consumption Operable at higher frequencies | Better power consumption Inoperable at higher frequencies |
| 1) Low-bandwidth to High-Bandwidth Transitions | Operate in DIQM when over a bandwidth threshold | Operate in PM when below a bandwidth threshold. |
| 2) Non-Contiguous Single-Carrier to Dual-Carrier Multiple-Carrier Transitions | Operate in DIQM for multiple carrier when risk of harmonic crosstalk (change in DCO frequency) | Operate in PM for single carrier for better DCO frequency mapping |
| 3) Contiguous Single-Carrier to Multiple-Carrier Transitions | Operate in DIQM when multiple carriers exceed a bandwidth threshold; Operate in DIQM when blocks are in the corner of a range | Operate in PM when using single carrier. Operate in PM when blocks are in the middle of a range |
| 4) Low EVM to High EVM Transitions | Operate in DIQM when there is a high EVM requirement (e.g., LTE for 256-QAM) | Operate in PM when there is a low EVM requirement (e.g.,, LTE for 64-QAM) |
| 5) LTE to 5G Transitions | Operate in DIQM when using 5G communications | Operate in PM when using LTE communications |
| 6) LTE to Wi-Fi Transitions | Operate in DIQM when using Wi-Fi communications | Operate in PM when using LTE communications |
| 7) Single to Multiple Transmitters at Same Frequency | Multiple transmitters at same frequency operate in DIQM | Single transmitter operates in PM |

Figure 7:
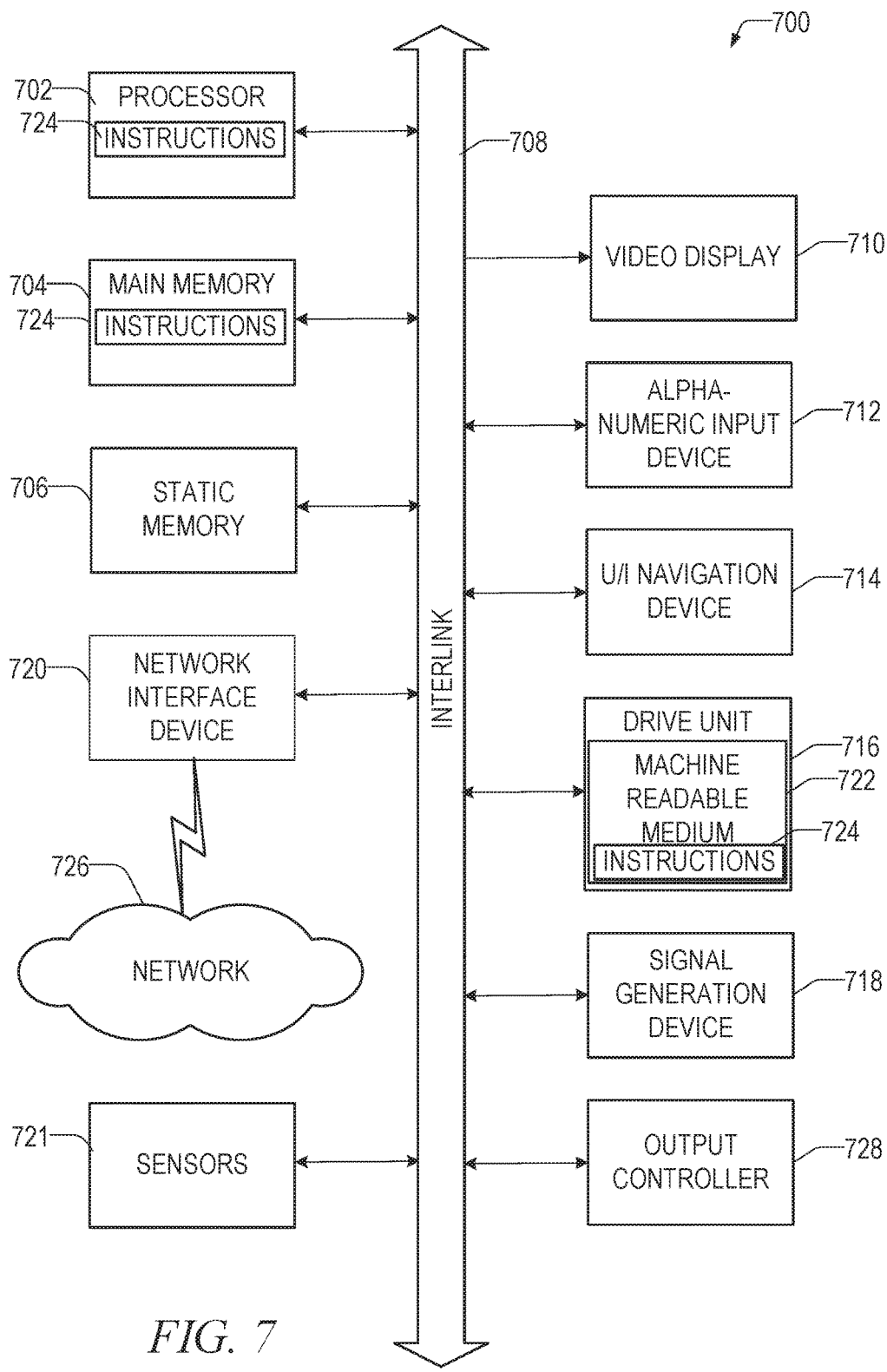
FIG. 7 is a block diagram illustrating a machine that may be a computer on which various processes described herein may be performed, in accordance with some aspects of the inventive subject matter.

FIG. 7 is a block diagram illustrating a machine that may be a computer or communications device on which various processes described herein may be performed. The machine (e.g., computer system) 700 may include a hardware processor 702 (e.g., a central processing unit (CPU), which may be an implementation of the processor 322 discussed above, a graphics processing unit (GPU), a hardware processor core, or any combination thereof), a main memory 704 and a static memory 706, which may be an implementation of the memory 324 discussed above, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example described herein, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB)), parallel, or other wired or wireless (e.g., infrared (IR), near field communication (NFC), etc.) controller connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 724 may further be transmitted or received over the communications network 105 using a transmission medium via the network interface device 720. The term "transmission medium" is defined herein to include any medium that is capable of storing, encoding, or carrying instructions for execution by the machine, and includes digital or analog communications signals or other medium to facilitate communication of such software.

The machine 700 may communicate with one or more other machines 700 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, WiGig®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), or any other way of transferring data between machines 700. In an example, the network interface device 720 may include one or more physical jacks (e.g., Ethernet, coaxial, or phone jacks) or one or more antennas to connect to the communications network 726.

In an example, the network interface device 720 may include a plurality of antennas to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques.

A wide variety of computing devices may constitute a machine 700, as described herein. The following list includes a variety of devices that may fit the definition of a machine 700: a personal data assistant (PDA), a cellular telephone, including a smartphone, a tablet computing device, a laptop computer, a desktop computer, a workstation, a server computer, a mainframe computer, and the like.

For the purposes of promoting an understanding of the principles of this disclosure, reference has been made to the various configurations illustrated in the drawings, and specific language has been used to describe these configurations. However, no limitation of the scope of the inventive subject matter is intended by this specific language, and the inventive subject matter should be construed to encompass all embodiments and configurations that would normally occur to one of ordinary skill in the art. The configurations herein may be described in terms of functional block components and various processing steps. Such functional blocks may be realized by any number of components that perform the specified functions. The particular implementations shown and described herein are illustrative examples and are not intended to otherwise limit the scope of the inventive subject matter in any way. The connecting lines, or connectors shown in the various figures presented may, in some instances, be intended to represent example functional relationships and/or physical or logical couplings between the various elements. However, many alternative or additional functional relationships, physical connections or logical connections may be present in a practical device. Moreover, no item or component is essential unless the element is specifically described as "essential" or "critical". Numerous modifications and adaptations will be readily apparent to those skilled in this art.

EXAMPLES

Example 1 is a transmitter device switchably operable in a digital IQ mode (DIQM) of operation and a polar mode (PM) of operation, comprising: a switch logic processor that determines an attribute of operation of the transmitter device; a switch that is connected to the switch logic processor and that is to switch operation of the device between the DIQM of operation and the PM of operation; when a first condition of the attribute is met, then the switch is to switch to or remain in the PM; and when a second condition of the attribute is met, then the switch is to switch to or remain in the DIQM.

In Example 2, the subject matter of Example 1 optionally includes wherein: the attribute is a modulation bandwidth to be used during a transmission time slot; the first condition is that the modulation bandwidth is less than or equal to a predefined bandwidth threshold (BT); and the second condition is that the modulation bandwidth is greater than the predefined BT.

In Example 3, the subject matter of any one or more of Examples 1-2 optionally include wherein: the attribute is whether a transmission is to be a non-contiguous single-carrier transmission or a non-contiguous multiple-carrier transmission to be used during a transmission time period; the first condition is that the transmission is to be a non-contiguous single-carrier transmission; and the second condition is that the transmission is to be a non-contiguous multiple-carrier transmission.

In Example 4, the subject matter of any one or more of Examples 1-3 optionally include wherein: the attribute is whether a transmission is to be a contiguous single-carrier transmission or a contiguous multiple-carrier transmission to be used during a transmission time period; the first condition is that the transmission is to be a contiguous single-carrier transmission; and the second condition is that the transmission is to be a contiguous multiple-carrier transmission.

In Example 5, the subject matter of any one or more of Examples 1-4 optionally include wherein: the attribute is whether a low or high EVM mode transmission is to be used during a transmission time period; the first condition is that the transmission is to be a low EVM transmission; and the second condition is that the transmission is to be a high EVM transmission.

In Example 6, the subject matter of Example 5 optionally includes wherein: the low EVM transmission utilizes a 64-QAM or lower order modulation scheme; and the high EVM transmission utilizes a 256-QAM or higher order modulation scheme.

In Example 7, the subject matter of any one or more of Examples 1-6 optionally include wherein: the attribute is whether an LTE or a 5G mode transmission is to be used during a transmission time period; the first condition is that the transmission is to be an LTE transmission; and the second condition is that the transmission is to be a 5G transmission.

In Example 8, the subject matter of any one or more of Examples 1-7 optionally include wherein: the attribute is whether an LTE or a Wi-Fi mode transmission is to be used during a transmission time period; the first condition is that the transmission is to be an LTE transmission; and the second condition is that the transmission is to be a Wi-Fi transmission.

In Example 9, the subject matter of any one or more of Examples 1-8 optionally include wherein: the attribute is whether a single or multiple transmitters will be used at a same frequency during a transmission time period; the first condition is that the transmission is to use a single transmitter; and the second condition is that the transmission is to use multiple transmitters at a same frequency.

In Example 10, the subject matter of any one or more of Examples 1-9 optionally include wherein the time period is a time slot.

In Example 11, the subject matter of any one or more of Examples 1-10 optionally include MHz.

In Example 12, the subject matter of any one or more of Examples 1-11 optionally include wherein, in a dual band mode of operation, a first band uses PM and a second band uses DIQM.

Example 13 is a method for operating a transmitter device that is switchably operable between a digital IQ mode (DIQM) of operation and a polar mode (PM) of operation, the method comprising: determining, with a switch, an attribute of operation of the transmitter device; when a first condition of the attribute is met, switching to or remaining in the PM; and when a second condition of the attribute is met, switching to or remaining in the DIQM.

In Example 14, the subject matter of Example 13 optionally includes wherein: the attribute is a modulation bandwidth to be used during a transmission time slot; the first condition is that the modulation bandwidth is less than or equal to a predefined bandwidth threshold (BT); and the second condition is that the modulation bandwidth is greater than the predefined BT.

In Example 15, the subject matter of any one or more of Examples 13-14 optionally include wherein: the attribute is whether a transmission is to be a non-contiguous single-carrier transmission or a non-contiguous multiple-carrier transmission to be used during a transmission time period; the first condition is that the transmission is to be a non-contiguous single-carrier transmission; and the second condition is that the transmission is to be a non-contiguous multiple-carrier transmission.

In Example 16, the subject matter of any one or more of Examples 13-15 optionally include wherein: the attribute is whether a transmission is to be a contiguous single-carrier transmission or a contiguous multiple-carrier transmission to be used during a transmission time period; the first condition is that the transmission is to be a contiguous single-carrier transmission; and the second condition is that the transmission is to be a contiguous multiple-carrier transmission.

In Example 17, the subject matter of any one or more of Examples 13-16 optionally include wherein: the attribute is whether a low or high EVM mode transmission is to be used during a transmission time period; the first condition is that the transmission is to be a low EVM transmission; and the second condition is that the transmission is to be a high EVM transmission.

In Example 18, the subject matter of Example 17 optionally includes wherein: the low EVM transmission utilizes a 64-QMM or lower order modulation scheme; and the high EVM transmission utilizes a 256-QMM or higher order modulation scheme.

In Example 19, the subject matter of any one or more of Examples 13-18 optionally include wherein: the attribute is whether an LTE or a 5G mode transmission is to be used during a transmission time period; the first condition is that the transmission is to be an LTE transmission; and the second condition is that the transmission is to be a 5G transmission.

In Example 20, the subject matter of any one or more of Examples 13-19 optionally include wherein: the attribute is whether an LTE or a Wi-Fi mode transmission is to be used during a transmission time period; the first condition is that the transmission is to be an LTE transmission; and the second condition is that the transmission is to be a Wi-Fi transmission.

In Example 21, the subject matter of any one or more of Examples 13-20 optionally include wherein: the attribute is whether a single or multiple transmitters will be used at a same frequency during a transmission time period; the first condition is that the transmission is to use a single transmitter; and the second condition is that the transmission is to use multiple transmitters at a same frequency.

In Example 22, the subject matter of any one or more of Examples 13-21 optionally include wherein the time period is a time slot.

In Example 23, the subject matter of any one or more of Examples 13-22 optionally include MHz.

In Example 24, the subject matter of any one or more of Examples 13-23 optionally include wherein, in a dual band mode of operation, a first band uses PM and a second band uses DIQM.

Example 25 is a computer program product comprising one or more tangible computer readable non-transitory storage media comprising computer-executable instructions operable to, when executed by processing circuitry of a device, configure the device to: operate a transmitter device that is switchably operable between a digital IQ mode (DIQM) of operation and a polar mode (PM) of operation, to: determine, with a switch, an attribute of operation of the transmitter device; when a first condition of the attribute is met, switch to or remain in the PM; and when a second condition of the attribute is met, switch to or remain in the DIQM.

In Example 26, the subject matter of Example 25 optionally includes wherein: the attribute is a modulation bandwidth to be used during a transmission time slot; the first condition is that the modulation bandwidth is less than or equal to a predefined bandwidth threshold (BT); and the second condition is that the modulation bandwidth is greater than the predefined BT.

Example 27 is a computer program product comprising one or more computer readable storage media comprising computer-executable instructions operable to, when executed by processing circuitry of a device, configure the device to perform any of the methods of Examples 13-24.

Example 28 is a system comprising means to perform any of the methods of Examples 13-24.

Example 29 is an apparatus for operating a transmitter device that is switchably operable between a digital IQ mode (DIQM) of operation and a polar mode (PM) of operation, comprising: means for determining, with a switch logic processor, an attribute of operation of the transmitter device; means for switching operation of the device between the DIQM of operation and the PM of operation; means for, when a first condition of the attribute is met, switching to or remaining in the PM; and means for, when a second condition of the attribute is met, switching to or remaining in the DIQM.

In Example 30, the subject matter of Example 29 optionally includes wherein: the attribute is a modulation bandwidth to be used during a transmission time slot; the first condition is that the modulation bandwidth is less than or equal to a predefined bandwidth threshold (BT); and the second condition is that the modulation bandwidth is greater than the predefined BT.

In Example 31, the subject matter of any one or more of Examples 29-30 optionally include wherein: the attribute is whether a transmission is to be a non-contiguous single-carrier transmission or a non-contiguous multiple-carrier transmission to be used during a transmission time period; the first condition is that the transmission is to be a non-contiguous single-carrier transmission; and the second condition is that the transmission is to be a non-contiguous multiple-carrier transmission.

In Example 32, the subject matter of any one or more of Examples 29-31 optionally include wherein: the attribute is whether a transmission is to be a contiguous single-carrier transmission or a contiguous multiple-carrier transmission to be used during a transmission time period; the first condition is that the transmission is to be a contiguous single-carrier transmission; and the second condition is that the transmission is to be a contiguous multiple-carrier transmission.

In Example 33, the subject matter of any one or more of Examples 29-32 optionally include wherein: the attribute is whether a low or high EVM mode transmission is to be used during a transmission time period; the first condition is that the transmission is to be a low EVM transmission; and the second condition is that the transmission is to be a high EVM transmission.

In Example 34, the subject matter of Example 33 optionally includes wherein: the low EVM transmission utilizes a 64-QMM or lower order modulation scheme; and the high EVM transmission utilizes a 256-QMM or higher order modulation scheme.

In Example 35, the subject matter of any one or more of Examples 29-34 optionally include wherein: the attribute is whether an LTE or a 5G mode transmission is to be used during a transmission time period; the first condition is that the transmission is to be an LTE transmission; and the second condition is that the transmission is to be a 5G transmission.

In Example 36, the subject matter of any one or more of Examples 29-35 optionally include wherein: the attribute is whether an LTE or a Wi-Fi mode transmission is to be used during a transmission time period; the first condition is that the transmission is to be an LTE transmission; and the second condition is that the transmission is to be a Wi-Fi transmission.

In Example 37, the subject matter of any one or more of Examples 29-36 optionally include wherein: the attribute is whether a single or multiple transmitters will be used at a same frequency during a transmission time period; the first condition is that the transmission is to use a single transmitter; and the second condition is that the transmission is to use multiple transmitters at a same frequency.

In Example 38, the subject matter of any one or more of Examples 29-37 optionally include wherein the time period is a time slot.

In Example 39, the subject matter of any one or more of Examples 29-38 optionally include MHz.

In Example 40, the subject matter of any one or more of Examples 29-39 optionally include wherein, in a dual band mode of operation, a first band uses PM and a second band uses DIQM.

The invention claimed is:

1. A transmitter device switchably operable in a digital IQ mode (DIQM) of operation and a polar mode (PM) of operation, comprising:
   a switch logic processor to determine an attribute of operation of the transmitter device; and
   a switch connected to the switch logic processor and that is to switch operation of the transmitter device between the DIQM of operation and the PM of operation, wherein when a first condition of the attribute is met, then the switch is to switch to or remain in the PM, and when a second condition of the attribute is met, then the switch is to switch to or remain in the DIQM; wherein:
   the attribute is whether a low or high error vector magnitude (EVM) mode transmission is to be used during a transmission time period;
   the first condition is that the transmission is to be a low EVM transmission; and
   the second condition is that the transmission is to be a high EVM transmission.

2. The transmitter device of claim 1, wherein:
the low EVM transmission utilizes a 64-Quadrature amplitude modulation (QAM) or lower order modulation scheme; and
the high EVM transmission utilizes a 256-QAM or higher order modulation scheme.

3. A transmitter device switchably operable in a digital IQ mode (DIQM) of operation and a polar mode (PM) of operation, comprising:
a switch logic processor to determine an attribute of operation of the transmitter device; and
a switch connected to the switch logic processor and that is to switch operation of the transmitter device between the DIQM of operation and the PM of operation, wherein when a first condition of the attribute is met, then the switch is to switch to or remain in the PM, and when a second condition of the attribute is met, then the switch is to switch to or remain in the DIQM; wherein, in a dual band mode of operation, a first band uses PM and a second band uses DIQM.

4. A method for operating a transmitter device that is switchably operable between a digital IQ mode (DIQM) of operation and a polar mode (PM) of operation, the method comprising:
determining with a switch logic processor, an attribute of operation of the transmitter device;
when a first condition of the attribute is met, switching to or remaining in the PM; and
when a second condition of the attribute is met, switching to or remaining in the DIQM; wherein:
the attribute is whether a low or high error vector magnitude (EVM) mode transmission is to be used during a transmission time period;
the first condition is that the transmission is to be a low EVM transmission; and
the second condition is that the transmission is to be a high EVM transmission.

5. The method of claim 4, wherein:
the low EVM transmission utilizes a 64-Quadrature amplitude modulation (QAM) or lower order modulation scheme; and
the high EVM transmission utilizes a 256-QAM or higher order modulation scheme.

6. A method for operating a transmitter device that is switchably operable between a digital IQ mode (DIQM) of operation and a polar mode (PM) of operation, the method comprising:
determining with a switch logic processor, an attribute of operation of the transmitter device;
when a first condition of the attribute is met, switching to or remaining in the PM; and
when a second condition of the attribute is met, switching to or remaining in the DIQM;
wherein, in a dual band mode of operation, a first band uses PM and a second band uses DIQM.

7. A computer program product comprising one or more tangible computer readable non-transitory storage media comprising computer-executable instructions operable to, when executed by processing circuitry of a device, configure the device to:
operate a transmitter device that is switchably operable between a digital IQ mode (DIQM) of operation and a polar mode (PM) of operation, to:
determine, with a switch logic processor, an attribute of operation of the transmitter device;
when a first condition of the attribute is met, switch to or remain in the PM; and
when a second condition of the attribute is met, switch to or remain in the DIQM; wherein:
the attribute is whether a low or high error vector magnitude (EVM) mode transmission is to be used during a transmission time period;
the first condition is that the transmission is to be a low EVM transmission; and
the second condition is that the transmission is to be a high EVM transmission.

* * * * *